Oct. 30, 1951     S. NICKEL     2,573,592
ARTIFICIAL BAIT CASTING OR TROLLING FISHING LURE
Filed Feb. 26, 1949
FIG. 1
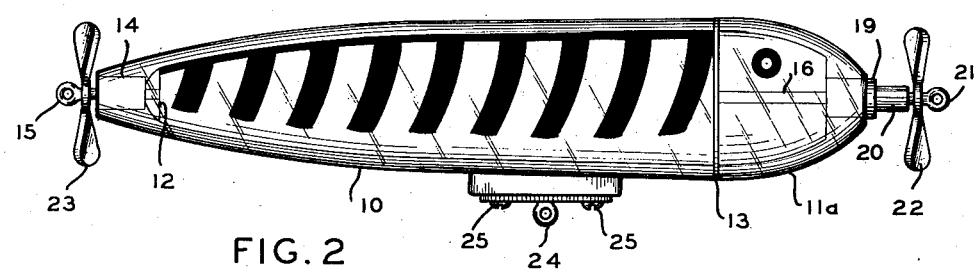
FIG. 2
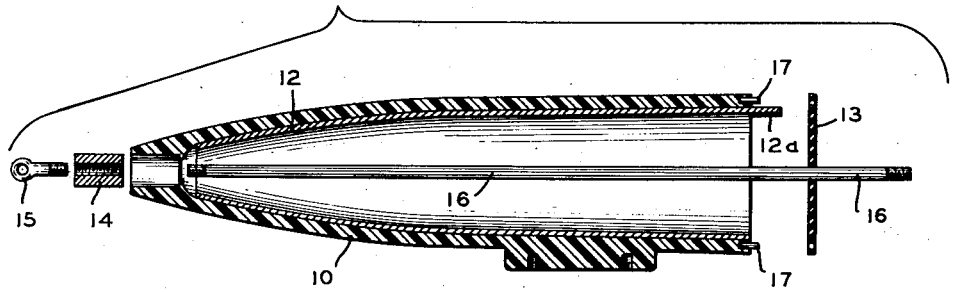
FIG. 3
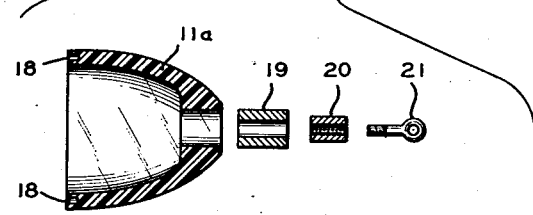
FIG. 4     FIG. 5     FIG. 6
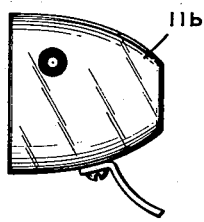 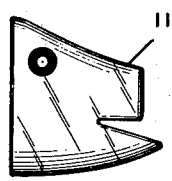 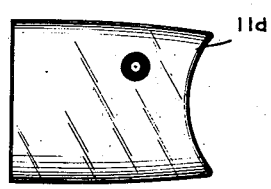
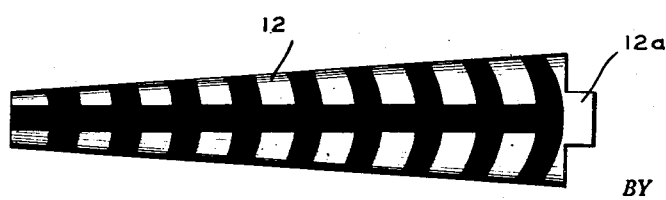
FIG. 7
*INVENTOR.*
SAGE NICKEL
BY
*A. Yates Dowell*
ATTORNEY

UNITED STATES PATENT OFFICE 2,573,592

ARTIFICIAL BAIT CASTING OR TROLLING FISHING LURE

Sage Nickel, Atlantic Beach, Fla., assignor, by direct and mesne assignments, to Nickel Tackle Company, Jacksonville, Fla., a corporation of Florida Application February 26, 1949, Serial No. 78,485

5 Claims. (Cl. 43—42.09)

This invention relates to artificial fish bait and more particularly to fish bait of the character ordinarily used in casting or trolling.

Numerous kinds of artificial fishing bait or lures have been used but a very prominent fault has been that each was distinct in itself and consequently it was necessary to carry a large number of lures and use a different lure for each color, for changing the action in the water, and the fishing depth in fishing for different kinds of fish in different waters.

Accordingly, it is an object of the invention to provide a simple, inexpensive fish bait or lure the appearance, buoyancy, and action of which in the water can be easily changed as well as a fish lure which may be used with or without spinners.

Further objects and advantages of the invention will be apparent from the following description taken in conjunction with the accompanying drawing, wherein:

Fig. 1 is a side elevation of a fish bait or lure illustrating one application of the invention;

Fig. 2, an exploded longitudinal section view through the main body portion of a lure;

Fig. 3, an exploded view of the head and associated parts;

Figs. 4, 5, and 6, side elevations of modified types of heads; and

Fig. 7, a side elevation of a conical tube or liner of light weight material of suitable color and design to give the desired appearance.

With continued reference to the drawings, the device of the present invention comprises an imperforate transparent hollow plastic body 10 for use with a series of heads 11$^a$, 11$^b$, 11$^c$, and 11$^d$, having eyes 26. The heads are made in several different shapes in order to vary the action of the lure when it is trolled, jerked or retrieved while in the water.

In view of the fact that the lure is hollow and transparent, in order to provide animation therefor, changeable or replaceable conical thin walled animation tubes 12 of cellophane or other lightweight material printed in colors and designs may be inserted in the body to form a visible lining therefor, the tubes being of a size to extend around within and fill the body and each being provided with a tab 12$^a$ which projects beyond the open end of the body so that the cone may be removed.

In the rear end of the transparent plastic body is anchored an internally threaded sleeve 14. The body and sleeve may be fastened together in any desired manner, as for example by molding the body about the sleeve. At its rear end the sleeve is adapted to receive an eye screw 15 to which a hook (not shown) may be attached and with its forward end the sleeve is adapted to receive the threaded end of a center rod 16.

Thereafter the desired head may be applied and to prevent relative rotation between the body and the head the body may be provided with dowel pins 17 and the head with correspondingly arranged sockets 18 therefor. Likewise, a gasket 13 may be employed between the body and the head to seal off the chamber in the body from the head portion of the body, such gasket being cemented to the front end of the body with the dowel pins projecting therethrough. Within the end of the head is a collar 19 of a diameter sufficient to slidably accommodate the center rod 16 and on to the end of the rod is mounted an internally threaded sleeve 20 corresponding to the sleeve 14. Into the other end of the sleeve 20 is threaded an eye screw 21 on which a spinner 22 may be mounted if desired. A similar spinner 23 may be mounted on the eye screw 15 at the other end of the device. The eye screw 21 is intended for attachment of the lure to a line with the end of the threaded sleeve 20 abutting the end of the collar 19, while a hook (not shown) may be attached to the eye screw 15. Beneath the hollow plastic body portion is mounted an attaching eye 24 by means of screws 25. The eye 24 is adapted to receive a hook (not shown).

The construction described above permits orienting the head or closure relative to the body of the lure.

The lure just described is buoyant, water-tight and ready for use as a floating lure. If desired water may be admitted into the hollow body of the lure so that it will be less buoyant and greater depth of operation at which the lure is moved through the water can be obtained.

It will also be apparent that instead of relying for color and luster upon the application of several coats of paint which can be easily chipped and scratched during use, that in the lure of the present invention the colors are always protected by the plastic body and closure member corresponding to the head and if scratched can be readily polished so that the lure is of lasting color and luster.

It will be obvious to those skilled in the art that various changes may be made in the invention without departing from the spirit and scope thereof and, therefore, the invention is not limited by that which is shown in the drawings and described in the specification but only as indicated in the appended claims.

What is claimed is:

1. A fishing lure comprising a hollow body portion of transparent material tapering between its large open end and its opposite end, a conical animation tube substantially corresponding in size to the interior of said hollow body portion but having a projection on its end by means of which it may be removed, a hollow closure for the large end of said body portion, a gasket between said body and closure portions, orienting means between said body and closure portions, a rod disposed axially of said body and closure portions and having its opposite ends threaded, a sleeve threaded on each end of said rod, the sleeve on one end of said rod being secured at one end of said body and closure portions, a collar on the opposite end of said rod between said sleeve and the other extremity of said body and closure portions, said hollow body and closure portions being imperforate whereby the buoyancy of the lure may be varied by the use of varying amounts of water therein, the outer end of each of said sleeves receiving an eye screw and a detachable eye member on the exterior of said body portion intermediate its extremities.

2. A fishing lure comprising a hollow body portion of transparent material tapering between its large open end and its opposite end, a conical animation tube substantially corresponding in size to the interior of said hollow body portion but having a projection on its end by means of which it may be removed, a hollow closure for the large end of said body portion, a gasket between said body and closure portions, orienting means between said body and closure portions, a rod disposed axially of said body and closure portions and having its opposite ends threaded, a sleeve threaded on each end of said rod, the sleeve on one end of said rod being secured at one end of said body and closure portions, a collar on the opposite end of said rod between said sleeve and the other extremity of said body and closure portions, the outer end of each of said sleeves receiving an eye screw, and an eye member on the exterior of said body portion intermediate its extremities.

3. A fishing lure comprising a hollow body portion of transparent material tapering between its large open end and its opposite end, a hollow closure for the large end of said body portion, a gasket between said body and closure portions, orienting means between said body and closure portions, a rod disposed axially of said body and closure portions and having its opposite ends threaded, a sleeve threaded on each end of said rod, the sleeve on one end of said rod being secured at one end of said body and closure portions, a collar on the opposite end of said rod between said sleeve and the other extremity of said body and closure portions, the outer end of each of said sleeves receiving an eye screw, and a detachable eye member on the exterior of said body portion intermediate its extremities.

4. A fishing lure comprising a hollow body portion of transparent material tapering between its large open end and its opposite end, a hollow closure for the large end of said body portion, a gasket between said body and closure portions, orienting means between said body and closure portions, a rod disposed axially of said body and closure portions and having its opposite ends threaded, a sleeve threaded on each end of said rod, the sleeve on one end of said rod being secured at one end of said body and closure portions, a collar on the opposite end of said rod between said sleeve and the other extremity of said body and closure portions, said hollow body and closure portions being imperforate whereby the buoyancy of the lure may be varied by the use of varying amounts of water therein, the outer end of each of said sleeves receiving an eye screw, and a detachable eye member on the exterior of said body portion intermediate its extremities.

5. A fishing lure comprising a hollow body of transparent material having a large open end and a smaller opposite end, a replaceable conical animation tube substantially lining the interior of said transparent hollow body portion, a closure for the large open end of said body portion, an axially disposed rod having its opposite ends threaded, a sleeve threadedly engaging each end of said rod, the sleeve on one end of said rod being anchored relative to said body, a collar slidably receiving said rod and being disposed between said body and the sleeve on the other end of the rod, said hollow body being liquid tight so that by the use of varying amounts of water therein the buoyancy of the lure may be varied.

SAGE NICKEL.

REFERENCES CITED

The following references are of record in the file of this patent:

UNITED STATES PATENTS

| Number | Name | Date |
|---|---|---|
| 1,207,588 | Maus | Dec. 5, 1916 |
| 1,288,118 | Morian | Dec. 17, 1918 |
| 1,833,241 | Wright | Nov. 24, 1931 |
| 2,112,385 | Smith | Mar. 29, 1938 |
| 2,288,595 | Peterson | July 7, 1942 |
| 2,295,292 | Rogers | Sept. 8, 1942 |
| 2,309,521 | Mabee | Jan. 26, 1943 |
| 2,510,566 | Flaherty | June 6, 1950 |

FOREIGN PATENTS

| Number | Country | Date |
|---|---|---|
| 487,609 | Great Britain | June 23, 1938 |